March 25, 1958     B. BOYD ET AL     2,827,786
ION TRACER AIRSPEED INDICATOR
Filed July 14, 1953
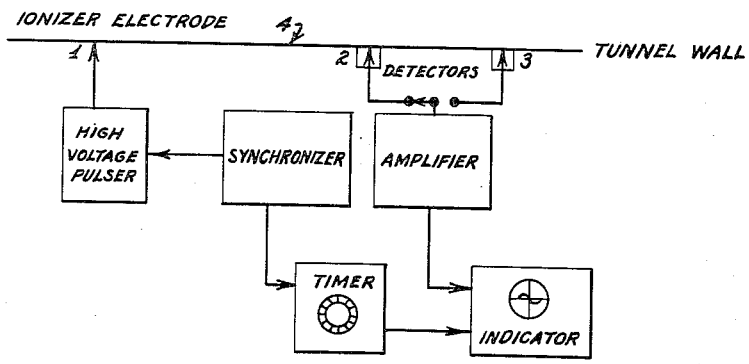
*Fig. 1*
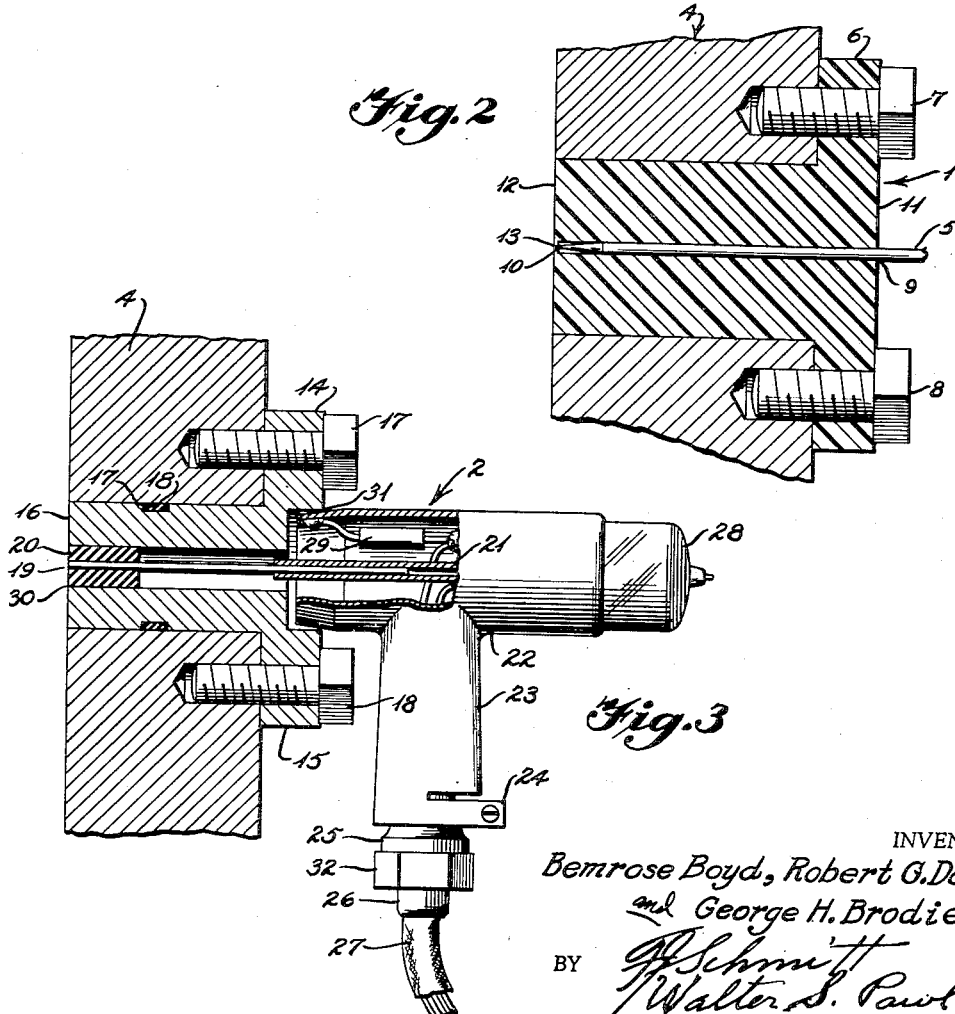
*Fig. 2*
*Fig. 3*
INVENTORS
Bemrose Boyd, Robert G. Dorsch
and George H. Brodie
BY *R. Schmitt*
*Walter S. Paul*
ATTORNEYS

United States Patent Office 2,827,786
Patented Mar. 25, 1958

2,827,786

ION TRACER AIRSPEED INDICATOR

Bemrose Boyd, Cleveland, Robert G. Dorsch, Lakewood, and George H. Brodie, Bedford, Ohio, assignors to the United States of America as represented by the Secretary of the Navy Application July 14, 1953, Serial No. 368,018

2 Claims. (Cl. 73—194)

(Granted under Title 35, U. S. Code (1952), sec. 266)

This invention relates to an apparatus for accurately measuring true airspeed by a tracer technique by measurement of the time of passage of a group of ionized molecules over a known distance without interference with the air flow. In this invention, ion bundles are produced in a pulse-excited corona discharge and are used as tracers with a radar-like pulse transit-time measuring instrument in order to provide a measurement of airspeed that is independent of all variables except time and distance.

Previous known devices have utilized tracer techniques of various types in the field of flow-visualization and in airspeed measurement. However, these devices have not been generally satisfactory because of interference with the flow being measured, particularly in supersonic flow, and because their dependence upon variables other than time and distance which necessitated their periodic calibration.

An object of this invention is to provide a satisfactory instrument for measuring airspeed at high Mach numbers.

An additional object of this invention is to provide an electronic true airspeed indicator which measures true airspeed by timing the passage of an ion bundle from one detector to another over a known distance and which utilizes conventional electronic components.

A further object of the invention is to provide a measurement of airspeed which is independent of all variables except time and distance.

A still further object of this invention is to provide an electronic true airspeed indicator which measures true airspeed by an ionization-tracer technique without interfering with the air flow.

Other objects and many of the attendant advantages of this invention will be readily appreciated as the same becomes better understood by reference to the following detailed description when considered in connection with the accompanying drawings wherein:

Fig. 1 is a schematic diagram of the subject invention.

Fig. 2 is an enlarged sectional view of the needle-point ionizer and its mounting.

Fig. 3 is a side view, partly in section, of the detector and its mounting.

The electronic true airspeed indicator, shown schematically in Fig. 1, is made up of the following components: an ion signal generator consisting of a synchronizer, a high-voltage pulser, and an ionizer 1 which is secured to wind tunnel wall 4; a signal receiver consisting of detectors 2 and 3 and an amplifier; a timer connected to the synchronizer; and an oscilloscope indicator connected to the amplifier and timer. All units of the apparatus operate from a 117-volt, single-phase, 60 cycle power source.

In the apparatus of Fig. 1, several possible methods for producing the ionization are available including the use of alpha particles, high-speed electrons, ultraviolet rays, X-rays, and various types of electric discharge ranging from precorona discharge to a spark. For the purposes of this invention, a corona discharge from a needle point electrode gives better results with respect to the signal produced than a spark discharge and also provides an abundant supply of ions even when the needle point is essentially flush with the surface of the wall 4. The selection of ions as tracers and the needle-point corona as the ionizing agent permits the instrumentation at both the ionizer and the detector to be mounted flush so as to be outside the air stream, and also permits the use of conventional electronic circuits in both the ionizer supply and the detector amplifier. In previous known devices, three types of operation have been used corresponding to the three types of signal modulation: frequency, phase, and pulse-time modulation. The selection of the pulse type of operation for this invention allows the ionizer supply to be patterned after the high-voltage pulser of a radar transmitter and allows the timer to be patterned after the timing circuit of a radar range unit, thereby providing an accurate direct measurement of pulse transit time for the determination of speed in terms of the fundamental units (time and distance). The mode of operation of this invention has been selected so as to allow the use of conventional electronic circuits, the details of which form no part of this invention. Examples of circuits which are suitable for use in the present invention are shown in detail in National Advisory Committee for Aeronautics Research Memorandum No. R. M. E52C31, published July 21, 1952.

In the synchronizer unit, shown schematically in Fig. 1, a phase-shift master oscillator provides a signal to each of two channels. In each channel the signal is amplified, squared, and peaked to trigger a low-power blocking oscillator. One channel feeds an external synchronizing signal to the timer unit, whereas the other drives a high-power blocking oscillator stage in order to produce the high-voltage output trigger pulse. This latter signal lags the external synchronizing signal in time phase, and makes it possible to observe on the oscilloscope indicator the pulse that travels to the receiver probe by direct induction as well as the signal resulting from the passage of the tracer ions. Pulse repetition frequencies of 400 and 800 cycles per second are satisfactory.

The high-voltage pulser of Fig. 1 is a commonly used radar pulser circuit. A voltage-doubling rectifier, the amplifier tubes, and the output transformer are connected in series to produce the high-voltage pulse. The high-voltage pulse transformer is a special unit wound on the powdered-iron core of a television flyback transformer. The transformer is insulated with Teflon and polyethylene tapes and has a voltage step-up of about 1 to 4. The output pulse is bidirectional with a damped oscillatory transient following the negative half cycle. No attempt is made to obtain a unidirectional pulse, as experience has shown that a bidirectional pulse gives better results. The effective width from the first positive half-power point to the trailing negative half-power point is 6 to 8 microseconds. The voltage peaks are of the order of 15,000 volts. When operating under various air pressures it is desirable to control the output of the ion signal generator. This control may be accomplished either by a voltage divider from ionizer to ground or by a variable transformer in the high voltage supply.

In the ionizer 1 shown in Fig. 2, the plastic insulator 6 is formed with a head portion 11 which abuts the outer surface of the wind tunnel wall 4 and a shank 12 which is inserted in a matching opening in the wall. The screws 7 and 8 pierce the head portion 11 and secure the insulator in position on the wall. The insulator 6 is center-tapped with a hole 9 which extends almost completely therethrough leaving a thin unpierced section 10 at the inner face of the shank 12. The ionizer electriode is in the form of a needle 5 which is inserted in the hole 9 and then forced in until the point 13 pierces the section 10 and is exposed at the inner face of the shank 12.

In the detector Fig. 3, brass plug 14 is secured to wall 4 by screws 17 and 18 with the flange 15 abutting the outer surface of the wall and with shank 16 received in a matching opening therein. A peripheral groove 17 is formed around shank 16 approximately midway the length thereof and forms a retaining seat for an O-ring seal 18. A central opening 31 is formed in the outer surface of the flange 15 and a hole 30 extends from the bottom of opening 31 throughout the length of shank 16. The pickup consists of an electrode 19 and an insulator 20 assembled in coaxial configuration in hole 30 and ending flush with the inner surface of the shank 16, the end of the electrode being exposed. The opposite end of electrode 19 is received in holder 21 which is connected to the tube receptacle (not shown) for tube 28. The detector housing 22 contains the electrode holder 21 and the input tube 28, which is a type 9002, connected as a cathode follower. The input grid resistor 29 is 1.5 megohms, which gives a low time constant so that the voltage developed on the input grid is proportional to the induced current rather than to the induced charge. The forward end of housing 22 is received in opening 31 and the rearward end is open to receive tube 28. The lateral extension 23 acts as a support for the leads from the tube receptacle and ends in a clamp 24 which secures socket 25 in place. The cable 27 ends in a mating plug 26 which is secured to the socket 25 by the nut 32.

For use with the interdetector method of measurement (using the transit time and distance from one detector to another) in order to more closely approximate the conditions of measurement at a point, the detector of Fig. 3 may be modified by replacing the single electrode and type 9002 tube with a type 6J6 dual triode and two electrodes mounted just ½ inch apart in the same plug, thus providing a transit distance of only ½ inch.

The receiver amplifier is a video amplifier with a pass band of about 800 kilocycles and which utilizes triodes in order to handle larger signal amplitudes. The signal from the detector is developed across a 39,000 ohm cathode resistor returned to a negative bias supply in order to extend the dynamic operating range. Two triodes (type 9002) are used in the input in a direct-coupled stage with a high plate load and a low cathode-follower output load resistor. Output to the indicator is taken through capacitive coupling from the cathode of the final stage.

The indicator used in the system is a commercial oscilloscope with provision for a driven (single) sweep with external synchronization. Various types of indication and indexing are possible including circular sweep with radial deflection, Z-axis blanking or intensification, various forms of electronically generated cursors or time markers, and so forth, but the orthogonal presentation and fixed mechanical index are entirely adequate when used with a delayed and expanded sweep.

The timer is a commonly used radar timing circuit and consists of a screen-coupled phantastron used in conjunction with appropriate pulse-shaping circuits. The pulse from the synchronizer triggers the phantastron time-delay circuit. After a delay time determined by the control setting, a pulse is produced that triggers the driven sweep in the indicator. Thus the position of any signal with respect to the indicator index is determined by the phantastron control setting in conjunction with the indicator centering control. The time interval between two signals may be obtained by setting first one signal then the other to the index while holding the centering control fixed and noting the difference between the delay-times corresponding to the control-dial readings. Calibration of the control dial is accomplished by means of an interval timer connected in such a manner that both the interval timer and the time-delay unit can be started by the same applied pulse, and the timer is stopped by the output pulse from the delay unit.

In the operation of the present invention, the synchronizer generates two synchronized pulse signals that trigger the driven sweep of the indicator oscilloscope and the high-voltage pulser, respectively. The high-voltage pulser supplies a pulse of 7 to 10 microseconds duration and approximately 15,000 volts peak to the ionizer. An ion bundle is formed in the air stream opposite the ionizer during its period of pulse excitation and is carried downstream by the air flow. A signal is produced in the receiver by induction when the ion bundle passes each detector. A pulse also appears in the receiver simultaneously with the ionizer excitation by direct induction from the ionizer. A fixed time delay is incorporated in the pulse channel from the synchronizer to the high-voltage pulser for the purpose of allowing the direct pulse to be viewed on the indicator within the sweep range of the timer. The timer, a variable time-delay circuit inserted between the synchronizer and the indicator sweep, enables the operator to position the ion signal from any detector or the direct signal from the ionizer under the indicator index. The crossover or point of zero signal amplitude provides a measurement point that can be accurately located. One of the two detectors is connected to the amplifier and a reading is taken; then the other detector is connected to the amplifier and another reading is taken. The difference between the readings of a calibrated dial on the timer for any two of these signals gives the transit time between the corresponding positions.

The primary use of the present invention is in conjunction with the wall of a wind tunnel, however, a somewhat more general alternate use is contemplated in which the ionizer and detectors are mounted in a streamlined housing of known flow characteristics for use in making measurements at points remote from a wall such as near the center of a large wind tunnel or on an aircraft.

In addition to the primary application, that is, to provide measurements without introducing shock waves in supersonic flow, flush instrumentation may be advantageous in situations where it is desirable to reduce the drag caused by conventional sensing devices or their supports, where instrumentation is adversely affected by high temperatures or erosion, or where its presence may cause increased ice accumulation.

Obviously, many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for indicating the speed of an airstream flowing along a surface comprising means for creating an ion bundle in said airstream by corona discharge including a needlepoint ionizer mounted flush with said surface, a high-voltage pulser connected to said ionizer and supplying high-voltage pulses of short duration to said ionizer; a synchronizer having two outputs, one of said outputs being connected to said high-voltage pulser; measuring means including first and second induction-type detectors mounted in spaced relation flush with said surface downstream from said ionizer, said ionizer and said detectors being aligned, amplifying means having input circuit means and output circuit means, switch means selectively connecting said input circuit means to said detectors, and indicator means connected to the other output of said synchronizer and to the output circuit means of said amplifier; whereby to measure the time interval for said ion bundle to travel from said first detector to said second detector.

2. Apparatus for indicating the speed of an airstream flowing along a surface comprising means for creating ion bundles by a corona discharge including a needlepoint ionizer mounted flush with said surface, a high-voltage pulser connected to said ionizer and supplying high-voltage pulses of short duration to said ionizer; a synchronizer unit having two outputs, one of said outputs being connected to said high-voltage pulser; measuring means including first and second induction-type detectors mounted in spaced relation flush with said surface downstream from said ionizer; said amplifier having input circuit means and output circuit means; means for selectively connecting said input means to said detectors, and indicator means including a driven sweep oscilloscope operatively connected to the other output of said synchronizer unit and to the output circuit means of said amplifier; whereby to measure the time interval for said ion bundle to travel from said first detector to said second detector.

References Cited in the file of this patent

UNITED STATES PATENTS

| | | |
|---|---|---|
| 2,569,974 | Campbell | Oct. 2, 1951 |
| 2,619,836 | Downing | Dec. 2, 1952 |
| 2,631,242 | Metcalf | Mar. 10, 1953 |
| 2,637,208 | Mellen | May 5, 1953 |
| 2,679,162 | Stuart | May 25, 1954 |